Jan. 19, 1960 J. E. CAVENEY 2,921,607

WIRING DUCT

Filed Feb. 11, 1957 2 Sheets-Sheet 1

INVENTOR.
Jack E. Caveney
BY
William P. Porcelli
Atty

INVENTOR.
Jack E. Caveney
BY
William P. Porcelli
Atty

United States Patent Office 2,921,607

Patented Jan. 19, 1960

2,921,607

WIRING DUCT

Jack E. Caveney, Chicago, Ill.

Application February 11, 1957, Serial No. 639,446

3 Claims. (Cl. 138—75)

This invention relates to improvements in electrical wiring ducts of a type used for containing and surrounding wires in association with control panels or other wiring installations where a plurality of wire conductors are used.

In installations where a plurality of wire conductors are used, it is common practice to group wires which run along parallel paths and harness or cover them in order to provide a neat, compact and protected wire arrangement. Different methods and structures have been employed for this purpose, such as wrapping with twine or wire, or encasing them in some manner, all of which have had certain shortcomings.

Two forms of improved wiring duct are shown in my co-pending applications entitled Wiring Duct, Serial No. 508,843, filed May 17, 1955, and Serial No. 569,159, filed March 2, 1956. The inventions shown and described in these applications generally consist of channel or U-shaped ducts into which the wires are positioned and thereafter provided with cover plates for retention of the wires. One of the major problems associated with wiring ducts of this nature are that they ordinarily require holes in their bottom walls for the positioning of screws or other fasteners for fastening the duct to a mounting board. If holes are provided, the layout of a control panel on which the duct is to be used requires the hole spacing to correspond to that provided in the duct by the manufacturer. This maximizes layout and assembly time by requiring accurate spacing of the holes on the mounting board.

It is one of the important objects of this invention to minimize layout and assembly time for wiring a control panel on which wiring duct is used by precluding the need for holes in the bottom walls of the wiring duct by providing a wiring duct assembly comprising a wiring duct frictionally retained in place by means of spring clips which are fastened, rather than the wiring duct itself, to the mounting board. By fastening the spring clips, rather than the wiring duct to the mounting board, accurate spacing of holes in the mounting board is eliminated, it being necessary only to align the holes at randomly spaced intervals along the straight line on which the wiring duct is to be mounted because accurate spacing of the spring clips is unnecessary. Another advantage of eliminating fasteners from the wiring duct is that the wiring duct is internally free of metal objects such as the heads of metal screws or fasteners, thereby precluding electrical shorts to ground through the objects or damage to the wires contained in the duct due to these obstructions. Still another advantage of eliminating the screw holes in the wiring duct and providing them in the spring clip is that the screws are made more accessible for tightening because they are used for fastening the clips before the wiring duct is positioned. When screw holes are provided in the bottom of wiring duct as on some prior art devices, if the wiring duct is narrow and deep, tightening of the screws or fasteners is oftentimes difficult because of their relative inaccessibility.

It is another object of this invention to provide a wiring duct, cover plate and clip assembly comprising a spring clip which both retains the wiring duct by means of frictional contact with it and, in addition, releasably retains the cover plate.

It is another object of this invention to provide a wiring duct, spring clip and cover assembly whereby the spring clips can be made narrow enough to engage the cover plate in localized regions. In this way the cover plates can readily be removed by squeezing in these localized regions rather than requiring compression along an extended length of the duct as in the case where the cover plates are fastened by means of continuous long flanges.

It is another object of this invention to provide a wiring duct assembly whereby a localized interlocking effect of the spring clips used prevents the cover plate from sliding longitudinally along and dislodging itself from the duct as urged by vibration or other externally applied forces.

These and other objects of the invention will be apparent to a person skilled in the art from a study of the following description with reference to the accompanying drawings, in which.

Figures 1, 2, 3, 4, 5, 6, 7:
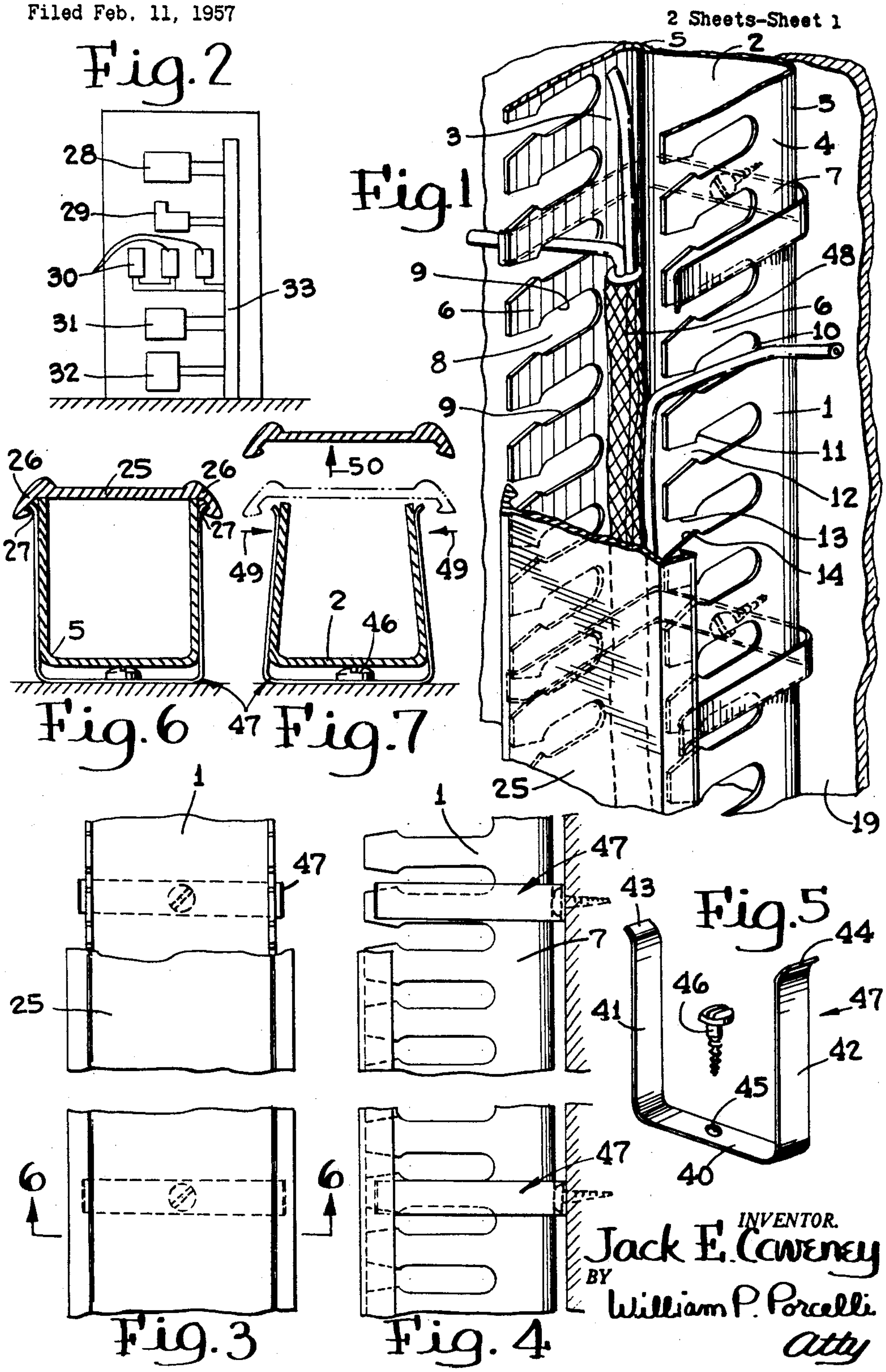
Figure 1 is a partially cutaway perspective view of a length of a preferred form of the wiring duct invention shown as it is used to encircle a group of wires mounted on a mounting panel.
Fig. 2 shows a front elevation of a typical electrical control panel on which the wiring duct is used.
Fig. 3 shows a partial and cutaway top plan view of the wiring duct shown in Fig. 1.
Fig. 4 shows a right side view of the duct as shown in Fig. 3.
Fig. 5 shows a perspective view of a preferred form of spring clip used to retain the wiring duct and its cover in place on a mounting panel.
Fig. 6 shows a cross-sectional view of the wiring duct as viewed along the line 6—6 of Fig. 3. This view shows the cover plate in position.
Fig. 7 shows a view similar to Fig. 6 except that the spring clip and sides of the wiring duct in the immediate vicinity of the spring clip are deflected and the cover plate is shown removed.

A preferred embodiment of the wiring duct invention, as shown in the drawings, comprises a U-shaped channel 1 which can be of any suitable depth or width and provided with a continuous bottom wall 2 connected at rounded corners 5 between the bottom edges of two parallel side walls 3 and 4. These side walls 3 and 4 are each provided at their upper edges with a plurality of individual flat fingers 6. The fingers 6, the narrow wall 7 and the bottom wall 2 are preferably all formed from a single piece of thin walled plastic material which has sufficient flexibility or resilience in it that the fingers 6 can be deflected both longitudinally and laterally of the channel 1.

The fingers 6 are preferably equally spaced from each other by means of elongated openings 8 having parallel side walls 9 connected by semi-circular curved portions 10 at their inner or lower ends and to smaller circular portions 11 at the outer ends. The circular portions 11 at the outer ends of these fingers are separated by spaces or gaps 12 which are in the form of outwardly diverging wedges created by diverging edges 13 and 14 of the fingers 6. The wedge shapes at the ends of these fingers 6 facilitate the entry of wires past them and into the channel 1 between the fingers 6. The radii portions 11 are used to retard or restrict the removal of inserted wires causing bulging or widening of the wires when attempted to be removed from the opening between the fingers 6. Even though not shown in this application, the radii 11 can be replaced with barbed recesses or square cornered recesses and achieve the same general effect of retarding removal of positioned wires.

A preferred form of spring clip 47 to be used for fastening the wiring duct 1 into position on a control panel 19 is shown in Fig. 5. It consists of a flat strip of metal folded into a U-shape having a bottom wall 40, connected at right angles to the lower ends of two arms 41 and 42. The upper ends of the arms 41 and 42 are provided with outwardly projecting lips 43 and 44. The bottom wall 40 is provided with a hole 45 through which a screw 46 or other fastener can be positioned when fastening the clip to a mounting panel.

When using the wiring duct, the spring clips 47 are mounted in a row along a line on the mounting board where the wiring duct is to be positioned, there being no need for more than random spacing between the clips. The screws 46 are passed through the holes 45 and then fastened into the mounting board in order to retain the clips. When the clips 47 are positioned in a straight line, the channel or wiring duct 1 is positioned into the U-shaped openings of these clips and there frictionally held. By providing approximately a five degree convergence of the arms 41 and 42 of the clips 47, the clips 47 hug the positioned channel 1 to frictionally engage it. With the channel 1 frictionally held by the spring clips 47, it is possible to readily insert wires 48 into the wiring duct. After the wires are positioned, a cover plate 25 is then mounted to cover the channel 1 by abridging the ends of the flexible fingers 6. The cover plate 25 is preferably provided with downwardly extending flanges 26 having inner recesses 27. As the cover plate 25 is being positioned, the arms 41 and 42 of the spring clips 47 are pressed toward each other to permit the recesses 27 of the cover plates 25 to pass by the lips 43 and 44 of the spring clips 47. When the cover plate 25 bottoms on the ends of the fingers 6 of the wiring duct, the arms 41 and 42 of the spring clip 47 are released so that the lips 43 and 44 engage the recesses 27 of the cover plate and thereby retain the cover plate in position. Because the cover plate 25 is preferably made of the same material as the wiring duct 1, it has a certain flexibility which permits its progressive positioning into contact with the lips 43 and 44 of consecutive clips 47, one at a time.

When it is desired to remove the cover plate 25 from the wiring duct, the side plates 41 and 42 of the clip 47 are deflected toward each other as shown by the direction of the arrows 49 in Fig. 7 to clear the lips 43 and 44 of the recesses 27 so that the cover plate can be raised upwardly in the direction of the arrows 50.

An advantage of making the clips 47 from narrow strip is that the width of the lips 43 and 44 are narrow, and when the cover plate 25 is urged longitudinally of the channel 1, the sharp corners of the lips 43 and 44 are rotated into engagement with the walls of the recesses 27 of the cover plate 25 to retard the longitudinal movement and prevent the cover plate from sliding off.

When using the wiring duct on a control panel 19 as shown in Fig. 2, wires from the various electrical units 28, 29, 30, 31 and 32 are fed into and centralized within the completely assembled wiring duct 33 to provide neatness and protection for the wires.

Figures 8, 9, 10:
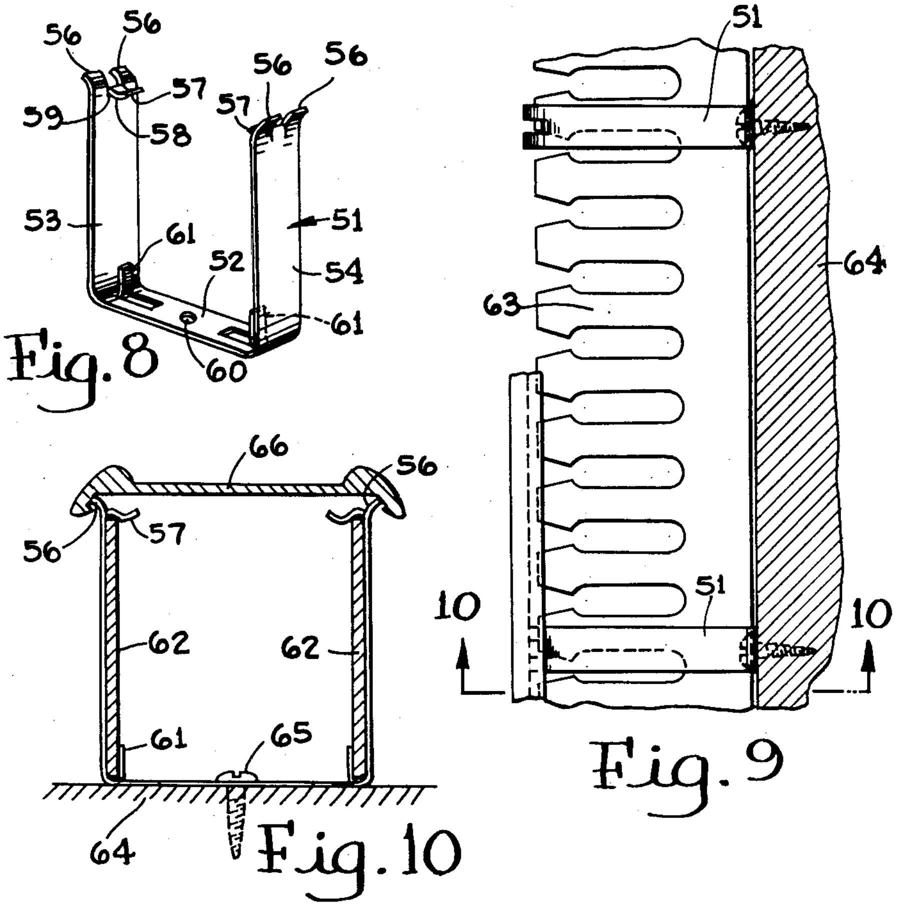
Fig. 8 shows a perspective view of an alternate spring clip construction.
Fig. 9 shows a side view similar to that shown in Fig. 4, but with the spring clip of Fig. 8 shown in place of the spring clip of Fig. 5.
Fig. 10 shows a sectional view along the line 10—10 of the wiring duct shown in Fig. 8.

In cases where there is no objection to having metal surfaces such as the fastening screws and other portions of the fastening clips within the confines of the wiring duct, an alternate spring clip structure as shown in Fig. 8 can be used. This spring clip 51 consists of a bottom wall 52 and two side walls or arms 53 and 54 connected perpendicularly at their inner ends to the ends of the bottom wall 52. The upper ends of these arms 53 and 54 are each provided with two outwardly extending lips 56 and with an inwardly extending lip 57 between them. The inwardly extending lip 57 is provided with a downward bend 58 so as to provide a recess 59 between the bend and the inside of the walls 53 and 54. The bottom wall 52 is provided with a hole 60 through which a screw for fastening the clip to the control panel can be passed. Near each end of the bottom wall 52 is provided an upwardly extending tab 61 which is preferably bent out from the metal provided in the bottom wall 52.

As shown in Fig. 10, the tabs 57 and 61 provide retainers for walls 62 which provide side walls for the wiring duct. In this form, the walls 62 have flexible fingers 63 corresponding in design and structure to the flexible fingers 6 of the wiring duct shown in Fig. 1. The basic difference in this construction is that this wiring duct itself does not have a bottom wall. Instead, the control panel board 64 is used as the bottom wall for the wiring duct. As before, the clips 51 are fastened to the control panel by means of screws 65, and in a similar manner. As the lips 43 and 44 are used to retain the cover plates 25 in the cases where the clips 47 are used, the clips 56 are used to retain similar cover plates 66. With this construction, even though the cost of the clip 51 is probably more than that of the clip 47, it is possible that the overall cost may be cheaper because it is not necessary to provide a U-shaped channel, but merely flat side walls 62.

Figure 11:
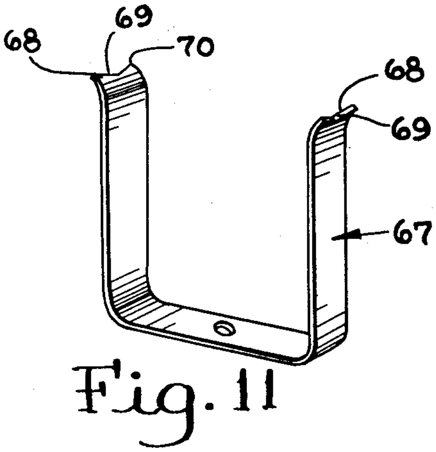
Fig. 11 shows still a third alternate construction for the spring clip shown in Fig. 5.

As an alternate construction for the spring clip 47, for the wiring duct 1, a spring clip 67 can be used as shown in Fig. 11. This spring clip 67 is identical to the spring clip 47 except that its lips 68 are each provided with a wedge shaped cutout 69 which provides sharp corners 70 which better prevent cover plate slippage.

Although two basic forms of the wiring duct have been shown and described, it should be apparent to those skilled in the art that it may be constructed in a different manner with slight modifications without departing from the scope of the appended claims defining the invention.

I claim:

1. A wiring duct comprising two spaced apart and parallel side walls, a U-shaped clip having a bottom arm connected at its ends to the lower ends of two side arms, a tab adjacent each end of said bottom arm projecting vertically upward from said bottom arm and spaced from one of said side arms a distance approximately equal to the thickness of a side wall, the upper end of each side arm being provided with a laterally extending lip, each of said side walls being positioned and retained against a side arm at the lower margin of the side wall by a tab and at its upper margin by one of said lips.

2. A wiring duct comprising two spaced apart and parallel side walls, a U-shaped clip having a bottom arm connected at its ends to the lower ends of two side arms, a tab adjacent each end of said bottom arm projecting vertically upward from said bottom arm and spaced from one of said side arms a distance approximately equal to the thickness of a side wall, the upper end of each side arm being provided with a laterally outward extending lip and a laterally inward extending lip, each of said side walls being positioned and retained along its lower margin with one of its wall surfaces against the inside surface of a side arm and its other wall surface against one of said tabs, and along its upper margin by contact with said laterally inward extending lip, said duct being provided with a cover plate abridging said clip and said side walls and being retained assembled to said duct by means of cover plate marginal recesses engaging the laterally outward extending lips of said clip.

3. A clip for a wiring duct comprising a bottom arm connected between two side arms to provide it with a U-shaped cross-section, the upper ends of said arms being provided with both outwardly and inwardly directed flanges, the bottom arm being provided with upwardly extending tabs closely adjacent the lower ends of said side arms.

References Cited in the file of this patent

UNITED STATES PATENTS

| | | |
|---|---|---|
| 749,391 | Lutz | Jan. 12, 1904 |
| 1,094,109 | Alpaugh | Apr. 21, 1914 |
| 1,344,728 | Shively | June 29, 1920 |
| 1,874,369 | Shoemaker | Aug. 30, 1932 |
| 1,906,874 | Platt | May 2, 1933 |
| 2,137,536 | McConnell | Nov. 22, 1938 |
| 2,148,892 | Bales | Feb. 28, 1939 |
| 2,259,151 | Clasby | Oct. 14, 1941 |

FOREIGN PATENTS

| | | |
|---|---|---|
| 1,779 | Great Britain | July 30, 1853 |
| 549,840 | Great Britain | Dec. 9, 1942 |
| 685,964 | Great Britain | Jan. 14, 1953 |

OTHER REFERENCES

Electrical Manufacturing, April 1956, p. 184. (Copy available in Div. 69.)